United States Patent
Rosenblatt et al.

(10) Patent No.: US 6,263,363 B1
(45) Date of Patent: Jul. 17, 2001

(54) SYSTEM AND METHOD FOR CREATING AN INTERNET-ACCESSIBLE WORKING REPLICA OF A HOME COMPUTER ON A HOST SERVER CONTROLLABLE BY A USER OPERATING A REMOTE ACCESS CLIENT COMPUTER

(75) Inventors: Jeremy Rosenblatt; John T. Baylor, both of Berkeley; Boris Krasnoiarov, El Cerrito, all of CA (US)

(73) Assignee: SkyDesk, Inc., San Diego, CA (US)

( * ) Notice: Subject to any disclaimer, the term of this patent is extended or adjusted under 35 U.S.C. 154(b) by 0 days.

(21) Appl. No.: 09/239,474

(22) Filed: Jan. 28, 1999

(51) Int. Cl.[7] ....................................... G06F 15/16
(52) U.S. Cl. .................... 709/217; 709/202; 709/203; 709/212; 709/216; 709/219
(58) Field of Search .................... 709/202, 203, 709/212, 216, 217, 219

(56) References Cited

U.S. PATENT DOCUMENTS

| | | | |
|---|---|---|---|
| 4,558,302 | 12/1985 | Welch | 340/347 DD |
| 5,446,888 | 8/1995 | Payne | 395/600 |
| 5,845,282 | 12/1998 | Alley et al. | 707/10 |
| 5,852,713 | 12/1998 | Shannon | 395/182.04 |
| 5,889,845 * | 3/1999 | Staples et al. | 379/211 |
| 5,958,007 * | 9/1999 | Lee et al. | 709/219 |

* cited by examiner

Primary Examiner—Saleh Najjar
(74) Attorney, Agent, or Firm—John L. Rogitz

(57) ABSTRACT

A user's home computer is backed up over the Internet or other network to a host computer site to create a virtual copy of the home computer at the host computer site. The user can then access the virtual copy over the Internet or other network using a remote access client computer, which can be any computer having a Web browser and a compatible remote computing protocol. In response to user commands from the remote access client, the host computer executes the applications of the virtual copy of the home computer and returns the results to the remote access client, with the user thus controlling the host as though the user were operating the home computer.

26 Claims, 3 Drawing Sheets

SYSTEM AND METHOD FOR CREATING AN INTERNET-ACCESSIBLE WORKING REPLICA OF A HOME COMPUTER ON A HOST SERVER CONTROLLABLE BY A USER OPERATING A REMOTE ACCESS CLIENT COMPUTER

FIELD OF THE INVENTION

The present invention relates generally to computers, and more particularly to systems and methods for allowing a user who is away from his or her home computer to access a replica of the home computer via the Internet.

BACKGROUND

Many people travel and when they do, from time to time they have the need to access a computer, typically their home computer. If the need is anticipated, appropriate files from the home computer can be imported into a portable computer such as a laptop computer or a palmtop computer running the Microsoft Windows CE® operating system, and the user can then operate the portable computer. However, it will readily be appreciated that the need might not be anticipated, or that the user might not travel with a portable computer, and that under such circumstances the user will not have the necessary files and applications immediately available. Even when the user has a portable computer and has tried to anticipate what work might be undertaken on it, the user might nonetheless discover that additional files or applications from the home computer are needed.

Systems have been provided for communicating with remote computers via the Internet, but existing systems only partially address the above-noted problem. For example, the remote access server (RAS) feature provided by Microsoft's Windows NT 4.0 operating system allows a user to transfer files from a remote computer, but it provides neither application support nor faithful reproduction of the home computer's desktop and other settings. Indeed, Microsoft Windows RAS simply facilitates the transfer of files between computers. Accordingly, any applications sought to be executed must be executed by the remote computer. Consequently, the remote computer cannot be any computing device such as, e.g., a so-called "thin client" that might have only a Web browser program and a generic computing protocol application available to it, but rather the remote computer must be a computer sufficiently powerful to execute the home computer's applications.

The system marketed under the trademark "PCAnywhere" allows a user at a remote computer to access and control a home computer via the Internet, but this system, like other existing computer communication systems, requires that the home computer be on, operating, and accessible from the Internet. Thus, if the home computer has been turned off, or if the PCAnywhere application has not been invoked on the home computer, or if the home computer Internet connection has been lost or terminated, access to the home computer is not possible.

We have considered the above-noted problems and have understood that it is desirable and possible to enable a person to virtually operate their home computer using any available computing device, including a thin client computer and public kiosks such as are found at airports, regardless of whether the home computer itself is available. More specifically, the present invention understands that the remote computer file backup systems disclosed in the present assignee's issued U.S. Pat. No. 5,794,254 and U.S. patent application Ser. Nos. 09/041,149 now U.S. Pat. No. 6,049,874 and 09/100,914 now U.S. Pat. No. 6,038,665, all of which are incorporated herein by reference, can be further used in cooperation with the novel programming disclosed herein to address the above-noted problems.

SUMMARY OF THE INVENTION

The invention is a general purpose computer programmed according to the inventive steps herein. The invention can also be embodied as an article of manufacture—a machine component—that is used by a digital processing apparatus and which tangibly embodies a program of instructions that are executable by the digital processing apparatus to undertake the present logic. This invention is realized in a critical machine component that causes a digital processing apparatus to perform the inventive method steps herein. In other aspects, a computer program product is disclosed which is readable by a digital processing apparatus and which tangibly embodies a computer program. The computer program product combines a computer readable medium with program code elements that undertake the logic disclosed below. And, a computer-implemented method is disclosed for executing the logic herein.

A method is disclosed for allowing an owner of a home computer having files and software applications to access a virtual copy of the home computer and to operate the virtual copy remotely via the Internet. The method includes obtaining information about all files (metadata), as well as copies of the files and applications from the home computer that are not already present in an extensible shared library (XSL). These items, along with any files/applications in the XSL that are included in the home computer, collectively establish a virtual copy of the computer. The virtual copy is stored at a host computer location remote from the home computer. Then, the virtual copy is made available via the Internet, such that the owner can operate a remote access client computer to access the virtual copy via the Internet to control the virtual copy as though the owner were operating the home computer, with applications being executed on a host computer at the host location to return results to the remote access client computer. In a preferred embodiment, the method includes periodically synchronizing the virtual copy of the home computer with the home computer.

It might happen that the applications from the home computer, being configured to run on the home computer's operating system, might not be configured to run on the host computer's operating system and/or may expect the operating system registry to include specific entries. With this in mind, the preferred method further includes generating, from a registry received from the home computer, a user host registry that is configured for the host operating system such that the user host registry reflects the user and application settings of the home computer. Moreover, the host operating system includes a kernel, and the preferred method still further includes inserting one or more hooks into the kernel to cause the kernel to access the user host registry in response to requests relating to the virtual copy that can be caused, e.g., by a control signal received from a remote access client computer operated by the owner for operating the virtual copy. Additionally, asynchronous procedure calls (APCs) can be used to manage transitions from the kernel mode to the user mode when the host operating system is an NT-based system. With this feature, no synchronization objects need be implemented to support calls from the kernel mode into the user mode.

In another aspect, a computer-implemented method for permitting a user to control a virtual copy of a home computer using a remote access client computer includes storing the virtual copy at the host computer, and then establishing communication between the remote access client computer and the host computer via a wide area computer network. The method also contemplates operating the remote access client computer to cause the host computer to execute applications of the virtual copy and to return results to the remote access client computer.

In still another aspect, a computer program product includes a computer program storage device readable by a host computer having a host operating system, and a program means on the program storage device that includes program code elements which embody instructions that can be executed by the host computer for performing certain method steps disclosed herein. These method steps, which permit a user to control a virtual copy of a home computer using a remote access client computer, include generating the virtual copy at the host computer, and generating a user host registry configured for the host operating system from a home registry received from the home computer. Also, registry calls are received. Further, the user host registry is selectively accessed in response to the registry calls to respond to the calls and generate results thereof, with the results being returned to the remote access client computer.

In yet another aspect, a computer program product includes a computer program storage device readable by a host computer having a host operating system, and a program means on the program storage device that includes program code elements which embody instructions that can be executed by the host computer for performing certain method steps disclosed herein. These method steps, which permit a user to control a virtual copy of a home computer using a remote access client computer, include generating the virtual copy at the host computer. The method steps also include receiving signals from the remote access client computer, at least some of which invoke calls such as registry calls. Hooks are inserted into a kernel of the host operating system to cause the kernel to respond to the calls using the host operating system to generate results, which are returned to the remote access client computer.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

As used herein, the term "home computer" means a target computer such as a desktop personal computer, laptop computer, or Microsoft Windows CE computer, or a master desktop computer of a corporation, the use of which might be sought by an owner when the owner is away from the home computer. The term "owner" refers to any authorized user of a home computer.

Figure 1:
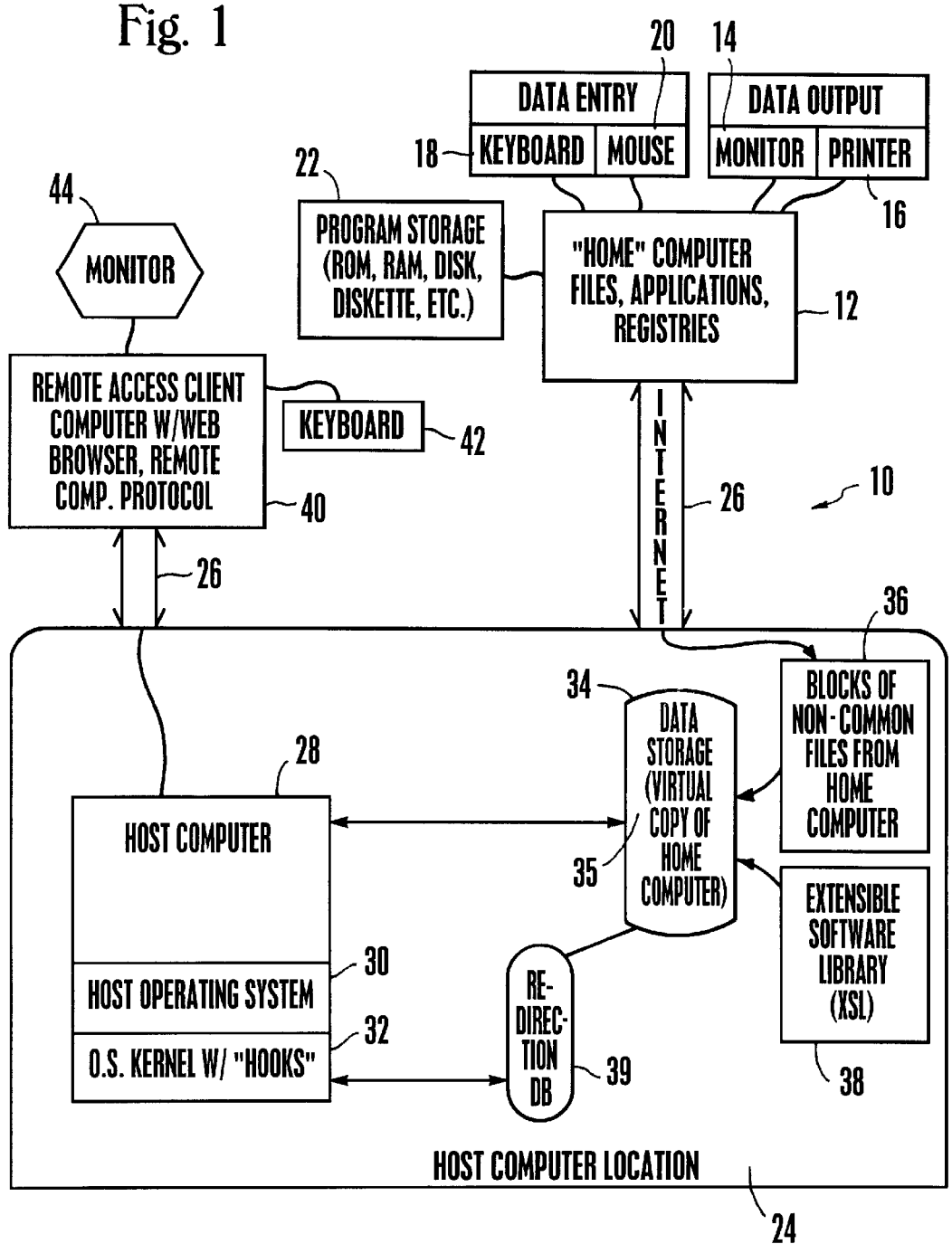
FIG. 1 is a schematic diagram of the present system.

Referring initially to FIG. 1, a system is shown, generally designated 10, for enabling an owner of a home computer 12 to operate a virtual copy of the home computer 12 when the owner does not have direct physical access to the home computer 12, even when the home computer 12 is not energized or otherwise accessible. As intended herein, the home computer 12 may be a personal computer, or the computer 12 may be any computer, including computers sold under trademarks such as AS400, with accompanying IBM Network Stations. Or, the computer 12 may be a Unix computer, or OS/2 server, or Microsoft Windows NT server, or a laptop or palm top computer. FIG. 1 also shows that the home computer 12 can include peripheral computer equipment known in the art, including an output device such as a video monitor 14 and/or printer 16 and an input device such as a computer keyboard 18 and/or mouse 20. Other output devices can be used, such as other computers, audio speakers, and so on. Likewise, input devices other than the keyboard 18 and mouse 20 can be used, e.g., trackballs, keypads, touch screens, and voice recognition devices.

The home computer 12 also includes one or more program storage devices 22 that can contain computer programs which may be executed by a processor within the computer 12 as a series of computer-executable instructions. These instructions may reside, for example, in RAM or ROM of the computer 12. Alternatively, the instructions may be contained on a data storage device with a computer readable medium, such as a computer diskette that is engageable with a floppy disk drive of the computer 12. Or, the instructions may be stored on a DASD array, magnetic tape, conventional hard disk drive, optical storage device, or other appropriate data storage device. In an illustrative embodiment of the invention, the computer-executable instructions may be lines of $C^{++}$code. While this discussion of the program storage device 22 focusses on the home computer 12, it is to be understood that the other computers disclosed herein likewise have program storage devices that contain computer-executable instructions for undertaking the logic of the present invention.

As shown in FIG. 1, the home computer 12 accesses a host computer location 24 via the Internet 26 or other appropriate computing network. The host computer location 24 includes a host computer 28 that in turn includes a host operating system 30 having an operating system kernel 32. In the presently preferred embodiment, the host computer 28 is a Microsoft Windows NT 4.0 Terminal Server having Citrix's MetaFrame add-ons to provide an Independent Computing Architecture (ICA), which is a remote computing protocol. Also, the host computer 28 includes a web server that can support a Web browser program or other hypertext markup language (HTML) or XML reader. As an alternative, the host computer 28 can be a Citrix WinFrame, or some other OS platform such as Win95 or Win98. In these cases the remote access portion could be provided by commercially available computing protocol products sold under the trade names PCAnywhere, ReachOut, or CarbonCopy just to provide remote access/control. Or, the host computer 28 can be a Microsoft Windows 2000 Server.

The host computer location 24 includes one or more data storages 34 that can include, if desired, their own dedicated server. Among the data stored in the data storages 34 are at least portions of virtual copies of home computers, including a virtual copy 35 of the home computer 12 shown in FIG. 1. The virtual copy of each home computer 12 is established by non-common file blocks 36 that are downloaded over the Internet 26 from the home computer 12 as described more fully below. These blocks include files, registry keys, system environment information, and metadata information such as file names, dates, attributes, etc. Also, the virtual copy of each home computer 12 is established by files from an extensible shared library (XSL) 38 at the host computer location 24. Typically, the files or blocks in the XSL 38 include files comprising applications such as word processing applications, presentation slide applications, and so on. The XSL 38 can grow over time as every file or block that has been encountered by the system 10 more than "N" times is automatically added to the XSL 38, provided the file or block is not on an "exclude" list. Moreover, a redirection database 39 that is associated with the virtual copy 35 indicates whether the file is in the XSL 38, the blocks of non-common files 36, or not yet in the virtual copy 35 (i.e., not yet copied from the home computer 12), for purposes to be disclosed shortly.

In turn, the virtual copies 35 of the home computers 12 are accessible by the host computer 28. It is to be understood that files or blocks of the home computer 12 that are in the XSL 38 need not be and preferably are not copied over into the virtual copy 35, but are simply identified in the metadata of the virtual copy 35.

The present assignee's issued U.S. Pat. No. 5,794,254 and U.S. patent application Ser. Nos. 09/041,149 and 09/100,914 set forth a preferred method for backing up file blocks in the home computer 12 to the host location 24, and this method is used herein to establish the virtual copy 35 of the home computer 12. In brief summary, the preferred backup method uses block and file signatures based on message digest (MD) 5 to uniquely identify files and blocks of data, with an include/exclude list being available to the owner of the home computer 12 to manage what is included in the backup list.

As disclosed in the above-referenced patent and applications, nominally all application and data files are included, as well as most operating system files and metadata. The MD5 signatures of the blocks of data in the home computer 12 are compared to signatures in a database to determine what blocks have been previously backed up and to detect what blocks have been changed since a previous backup. The backup engine transmits to the host location 24, via the Internet 26, only those blocks that have not been previously backed up or that have changed since the previous backup, to minimize transmission time. Preferably, the metadata is transmitted during backup time before changed blocks are transmitted, so that the metadata can be used by the host computer 28 to support subsequent access of the virtual copy 35 in the absence of some file data. Maintaining a separate record of the metadata as it exists on the home computer 12 also permits the host computer 28 to preserve the appearance of the relationship between long and short file names even if the actual short name of a file in the virtual copy 35, as assigned by the host computer 28, differs from the short name used by the home computer 12.

As part of the MD5 comparison, the logic determines whether any files of the home computer 12 are present in the XSL 38. Files that are present in the XSL 38 are not copied from the home computer 12; rather, the metadata received from the home computer 12 indicates that the home computer 12 includes files that are already present in the XSL 38. Accordingly, the non-common blocks 36 along with files in the XSL 38 that are recorded as being present in the home computer 12 establish the virtual copy 35 of the home computer 12 at the host location 24.

In addition, as set forth in greater detail below, registry and system environment information backed up from the home computer 12 is not only saved at the host location 24, but is also copied and then reformatted as appropriate for use by the host operating system 30. This is to support the host operating system 30 in producing the same user-specific settings that the user has on the home computer 12. These include such items as desktop arrangement, screen colors, and search path settings. It is also to support the host OS 30 in executing applications and performing operations that depend on the existence of certain registry information in the OS of the machine on which the application or operation is executing. For example, a word processing application may query the registry for various user settings of the names and path of various component files. Or, a double click operation on a document file may cause a registry query to determine what application should be launched to open that document. In addition, the registry copying and reformatting supports the use of a host OS 30 that is different from the OS of the home computer 12.

For present purposes, assume that the home computer 12 operating system is Microsoft Windows 95, while the host operating system 30 is Microsoft Windows NT. In this case, the home computer registry is copied to a temporary location and then various registry entries are changed to establish a modified registry when the entries are different between the home computer 12 operating system and the host operating system 30. Essentially, the modified registry is a user host registry configured, from a registry received from the home computer 12, for the host operating system 30.

Also, in the above example Microsoft Windows 95 "path" environment registry strings are patched into the path value in the registry key HKEY_CURRENT_USER\Environment in the modified home computer 12 registry within the host computer 28. After any necessary modifications per the above disclosure, the keys from the HKEY_CURRENT_USER ("HKCU") section of the home computer 12 are used to form the HKEY_USER registry for the NT profile that is associated with the domain account to be used by the owner of the home computer 12 when logging on to the host computer 28 to access the virtual copy 35 using the remote access client computer disclosed below. Also, the keys from the HKEY_LOCAL_MACHINE ("HKLM")\Software section of the user's home computer 12 are modified as necessary and used to form a new key under the user's HKEY_USER registry such that it becomes "HKEY_CURRENT_USER\Hkey_local_machine\Software" when accessed by the host OS 30.

Completing the description of FIG. 1, after having established the virtual copy 35 of the home computer 12 at the host location 24, the owner of the home computer 12 can access the virtual copy 35 via the Internet 26 using a remote access client computer 40. The remote access client computer 40 can be any computer, including a so-called "thin client" such as a Microsoft Windows Terminal Device that might be located in, e.g., an airport terminal, provided that the client computer 40 has a Web browser and a compatible remote computing protocol capability such as Citrix ICA. The ICA protocol can be implemented by commercially available software that exists in many forms, ranging from embedded support, to dedicated client packages, to web browser plug-ins, to ActiveX controls. Importantly, the client computer 40 need have no further capability, including the capability to run the particular operating system used by the home computer 12. The remote access client computer 40 can have an input device such as a keyboard 42 and an output device such as a monitor 44.

Figure 2:
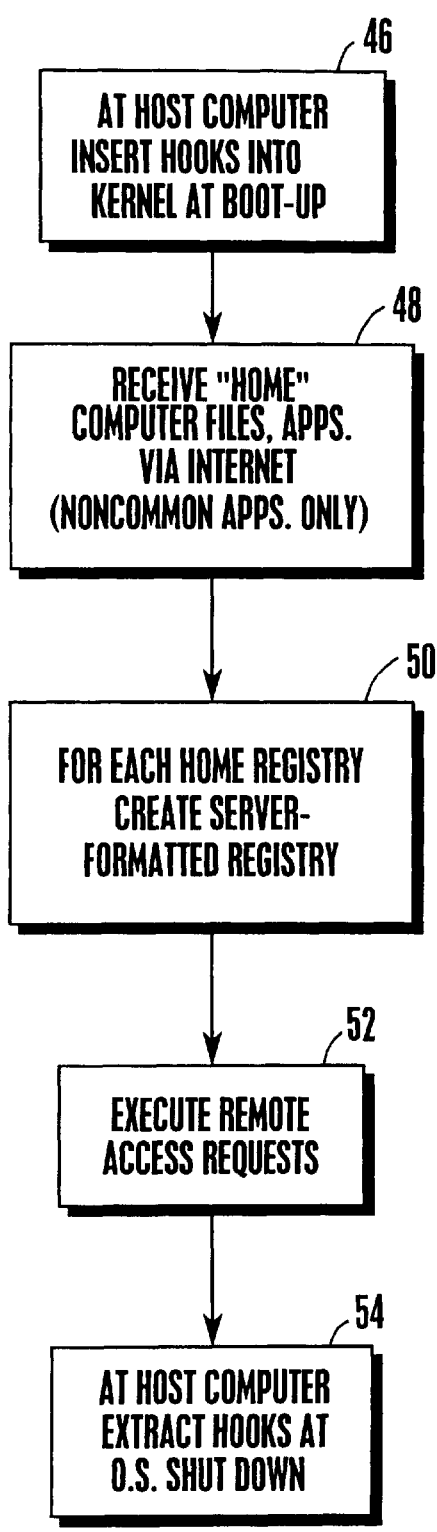
FIG. 2 is a flow chart of the overall process at the host computer.

Now referring to FIG. 2, the logic of the present invention can be seen. As recognized by the present invention and as mentioned above, the home computer 12 might use an operating system that is different from the host operating system 30. When this is the case, the applications in the virtual copy 35 are configured for the home computer operating system, not for the host operating system 30. Nevertheless, the host operating system 30 must execute the applications under the control of the remote access client computer 40.

In accordance with the present invention, to permit the host computer 28 to nonetheless execute applications from the home computer 12, both file system and registry "hooks" are inserted into the kernel 32 of the host operating system 30 during boot-up of the host computer 28 at block 46 of FIG. 2. Essentially, the present hooks are software-implemented mechanisms that intercept files system calls and registry calls from a home computer application in the virtual copy 35 and redirect the calls as appropriate for the host operating system 30. In the presently preferred embodiment, the hooks are inserted as patches to the kernel 32 jumptable by patching assembly "jmp" instruction address values with new values. The old values are saved, and the old values replace the new values when the hooks are extracted at block 54 below.

In one presently preferred embodiment, the patched functions include ZwOpenkey() and ZCreateKey() (for registry interception) and, for file interception, ZwOpenSection(), ZwCreateDirectoryObject(), ZwCreateFile(), ZwQueryDirectoryFile(), and ZwClose(). Other patches as appropriate can be added to the above example.

The file system hooks direct the host computer 28 to search, during subsequent sessions using the remote access client computer 40, the XSL 38 in response to every call to a virtual copy 35. As stated above, the redirection database 39 indicates whether the file is in the XSL 38, the blocks of non-common files 36, or not yet in the virtual copy 35 (i.e., not yet copied from the home computer 12). In conjunction with the redirection database 39, the file system hooks cause file accesses to be directed to the appropriate location, e.g., the XSL 38, or the blocks of non-common files 36. Also, in instances where the virtual copy 35 is located on a file server that is different from the host computer 28, the file system hooks cause the host operating system 30 to make the virtual copy 35 appear as though it is on a data storage device of the host computer 28 rather than on a network device. Application calls that attempt to access resources outside the scope of the virtual copy 35 are intercepted by the file system hooks and error messages are generated.

The registry hooks, on the other hand, direct the host computer 28 to first access the modified home computer registry (HKEY_CURRENT_USER\HKEY_LOCAL_MACHINE\SOFTWARE) in the host computer 28 in response to calls to HKEY_LOCAL_MACHINE\SOFTWARE. As described in further detail below in reference to FIG. 4, if the requisite information is not found, the host computer 28 then accesses the unmodified registry (HKEY_LOCAL_MACHINE\SOFTWARE) in the host computer 28.

At block 48, changed home computer 12 file blocks, registries, environment information, and metadata are received in accordance with the above disclosure. Moving to block 50, for each home computer registry the logic creates a modified, server-formatted registry (including HKEY_CURRENT_USER\HKEY_LOCAL_MACHINE\SOFTWARE) as discussed above. In greater detail, in the modified, server-formatted registry for the case in which the home computer 12 operating system is Microsoft Windows 95 and the host operating system 30 is Microsoft Windows NT, the registry has the following modifications:

All values except BorderWidth are removed from the key "HKCU\Control Panel\Desktop\WindowMetrics";

The keys found under "HKCU/Software/Microsoft/Windows Messaging Subsystem" on the home computer 12 are moved to "HKCU/Software/Microsoft/Microsoft Windows NT\Current Version\Windows Messaging Subsystem"; and The security of all keys is adjusted for access under NT security.

Other modifications as appropriate can be added to the above.

Moving to block 52, a user operates the remote access client computer 40 to log on to the host computer location 24, which can be rendered as a Web site, and, using the client computer 40, the user causes the host computer 28 to execute the virtual copy 35 of the user's home computer 12. The process ends at block 54, wherein the hooks are extracted from the kernel 32 of the host computer operating system 30 when the operating system 30 is shut down (e.g., for maintenance). The hooks are extracted by replacing the values in the "jump" instruction address that had been patched at block 46 with the original values. Thus, no permanent change to the kernel 32 of the host operating system 30 is made.

Figure 3:
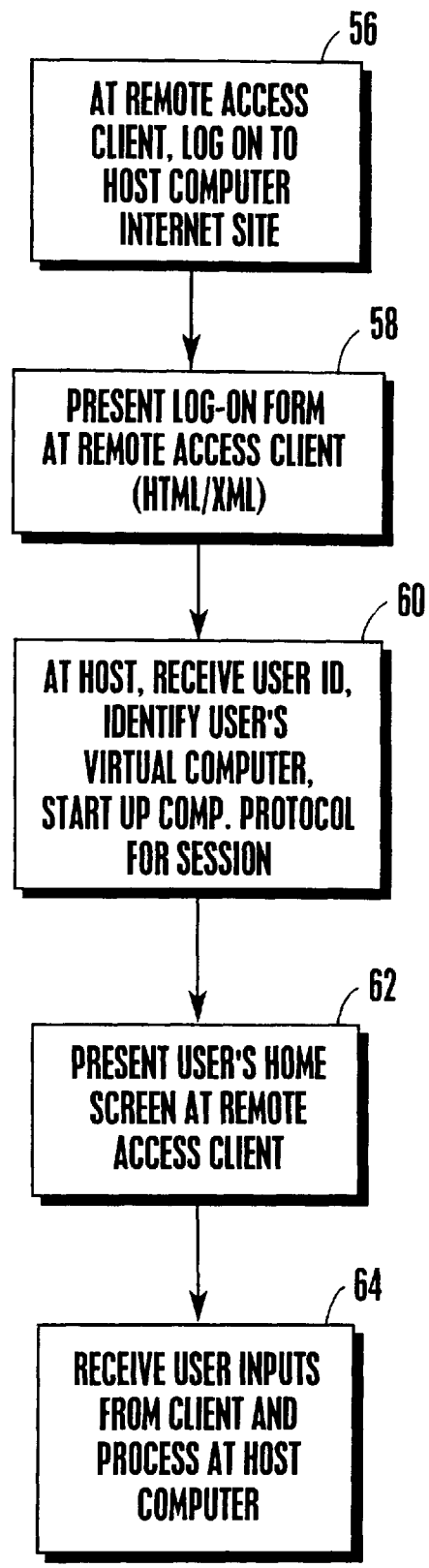
FIG. 3 is a flow chart showing the logic of the remote access client computer interaction with the host computer.
Figure 4:
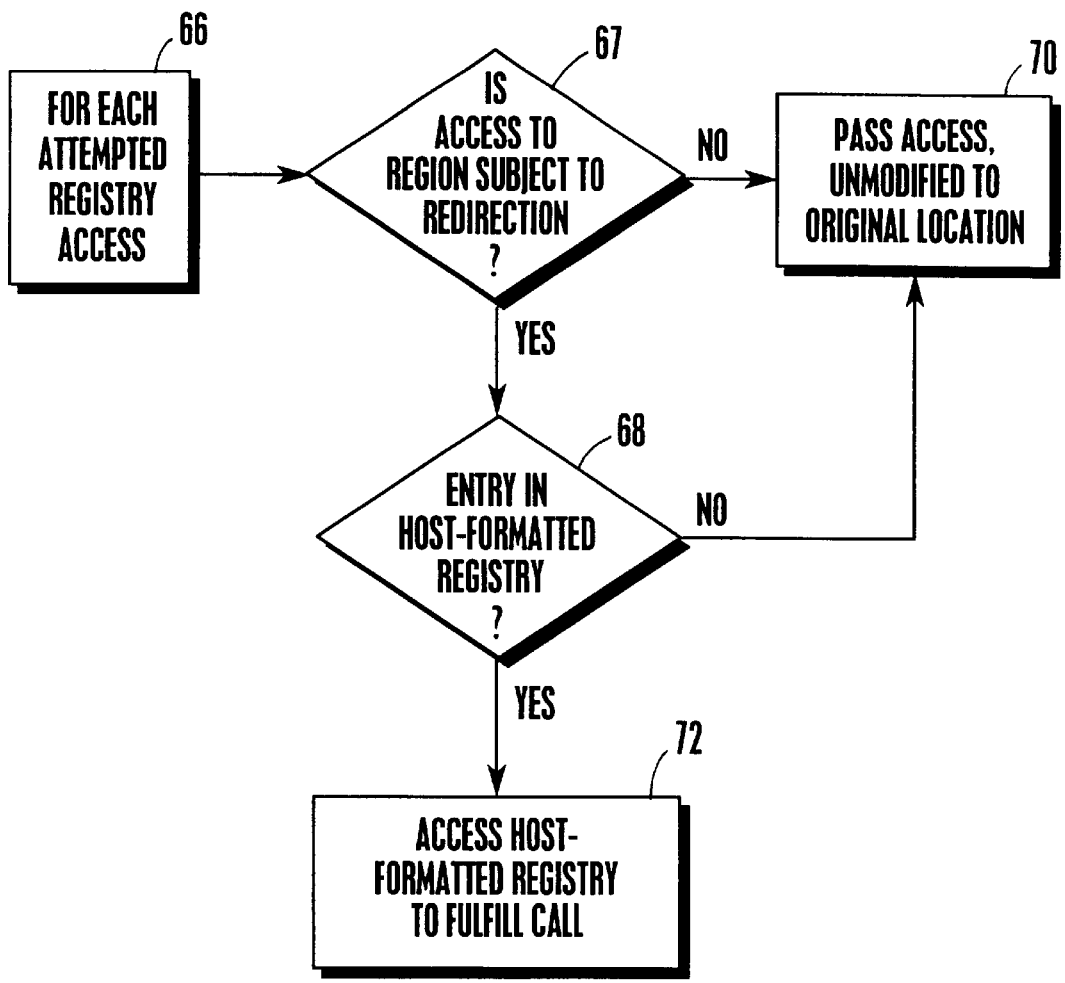
FIG. 4 is a flow chart showing the logic of the present host operating system kernel hooks.
Figure 5:
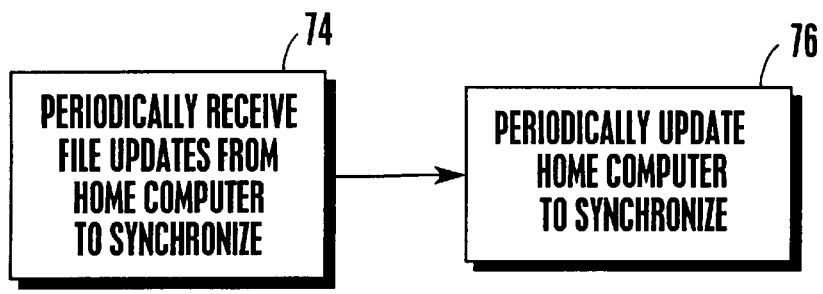
FIG. 5 is a flow chart showing the synchronization logic.

FIGS. 3–5 show further details of the processes undertaken at block 52 in FIG. 2. Commencing at block 56, at the remote access client computer 40 the owner of the home computer 12 logs on to an Internet or Web site that is associated with the host computer 28. Moving to block 58, forms established by standard web pages and Active Server Pages (ASP) are presented by the host computer 28 on the monitor 44 of the client computer 40, and the user fills in the forms with user identification information and other information as appropriate and returns the forms to the host computer 28. Then, at block 60, the host computer 28 receives the user information and based thereon identifies which of the virtual copies 35 to access. The host computer 28 then starts the computer protocol (ICA) for the session by sending a page of the ICA MIME type to the remote access client computer 40 which invokes its remote computing protocol in response. It is to be understood that the necessary protocol software can be downloaded by the client computer 40 from any appropriate Web site having the protocol.

Proceeding to block 62, the user's home screen is transmitted from the host computer 28 to the client computer 40 and presented on the monitor 44. At block 64 subsequent usergenerated control signals are transmitted from the client computer 40 to the host computer 28 to direct the host computer 28 to execute applications using the virtual copy 35 of the home computer 12, as though the user at the client computer 40 were actually operating the home computer 12.

FIG. 4 shows the details of the "hook" logic discussed above. For each registry call the present "hook" logic essentially enters a routine at block 66. Moving to state 67, it is determined, using the redirection database 39, whether the call is to a portion of the registry that is subject to redirection. Calls to portions of the registry that are not related to software typically are not redirected. For example, calls to determine what hardware is present should not be redirected. Also, calls related to user-specific settings will be satisfied by the above-described modified registry. In the preferred embodiment, only calls to HKLM\Software are redirected, although the logic can redirect additional calls as may become necessary or desirable.

When the test at decision diamond 67 is positive, the logic moves to state 68, which has been illustrated as a decision diamond for clarity of disclosure. At state 68 the logic determines whether an appropriate entry exists in the modified (i.e., host-formatted) registry discussed above. In some instances, such as for calls to machine-specific settings, the test at decision diamond 68 might be negative, in which case the logic proceeds to block 70 to access the unmodified registry to fulfill the call. Also, as intimated above when the test at state 67 is negative, the logic moves to block 70. In contrast, when the test at decision diamond 68 is positive, the logic proceeds to block 72 to access the modified copy of the home registry (associated with HKEY_CURRENT_USER\HKCU\HKEY_LOCAL_MACHINE\SOFTWARE) to fulfill the call. It is to be understood that the file system hooks are likewise invoked for each file system call to function as disclosed above. In the file system case, the decision whether and where to redirect calls is made by querying a database associated with the virtual copy 35 containing the metadata from the home machine 12 and all XSL entries.

In addition, the present invention envisions the use of Asynchronous Procedures Calls (APC) during every registry or file system call to manage the transition from the kernel mode to the user mode of the operating system 30 (as opposed to transitions from the user mode to the kernel mode) without requiring the implementation of synchronization objects. In the present implementation, this is accomplished by causing the user mode to render dummy requests to the kernel mode. When the kernel mode subsequently receives an actual request from the user mode, the kernel mode fills in one of the dummy requests with the reply to the actual request, such that the kernel mode does not have to await the user mode in completing a call. The user mode will finish the actual request by asynchronously sending the result of the actual request to the kernel mode in a new dummy request, thus increasing the efficiency of the present invention and obviating the need for synchronization objects in kernel mode to user mode transitions.

Now referring to FIG. 5, at block 74 file updates from the home computer 12 are periodically (e.g., daily) received by the host location 24 as described in the above-referenced patent and applications to synchronize the home computer 12 with its virtual copy 35 at the host location 24. Also, at block 76 changes made to the virtual copy 35 during a session remotely controlled from the remote access client computer 40 are sent to the home computer 12 to synchronize the home computer 12 with its virtual copy 35. The process at block 76 can be undertaken by several methods according to user selection, including emailing the changes to the home computer 12 (or elsewhere as designated by the user), selecting where the updates will be stored on the home computer 12, and selecting how file conflicts are handled (using conventional conflict handling methods).

While the particular SYSTEM AND METHOD FOR CREATING AN INTERNET-ACCESSIBLE WORKING REPLICA OF A HOME COMPUTER ON A HOST SERVER CONTROLLABLE BY A USER OPERATING A REMOTE ACCESS CLIENT COMPUTER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A method for allowing an owner of a home computer having files and software applications stored therein to access a virtual copy of the home computer and operate the virtual copy remotely via the Internet without requiring access to the home computer during operation of the virtual copy, comprising:

obtaining copies of the files and applications from at least one source selected from the group of sources comprising: the home computer, and an extensible shared library, the copies collectively establishing a virtual copy of the computer;

storing the virtual copy at a host computer location remote from the home computer, the host computer location including at least one host computer; and making the virtual copy available via the Internet or other network, such that the owner can operate a remote access client computer to access the virtual copy via the Internet or other network to control the virtual copy as though the owner were operating the home computer, including causing copies of the home computer applications to be executed on the host computer to return results to the remote access client computer.

2. The method of claim 1, further comprising periodically synchronizing the virtual copy of the home computer with the home computer.

3. The method of claim 1, wherein the home computer has a home operating system and the host computer has a host operating system, and the method further comprises:

generating a user host registry configured for the host operating system from a registry received from the home computer, such that the user host registry reflects the user and application settings of the home computer.

4. The method of claim 3, wherein the host operating system includes a kernel, and the method further comprises:

inserting one or more hooks into the kernel to cause the kernel to selectively access the user host registry in response to requests relating to the virtual copy.

5. The method of claim 1, wherein the home computer has a host operating system including a kernel mode and a user mode, and the method further comprises using asynchronous procedure calls (APCs) in transitions from the kernel mode to the user mode, whereby no synchronization objects need be implemented to support calls from the kernel mode into the user mode.

6. The method of claim 1, wherein the home computer and host computer have respective operating systems, and the operating system of the host computer is different from the operating system of the home computer.

7. A general purpose computer programmed to undertake the method of claim 1.

8. A computer-implemented method for permitting a user to control a virtual copy of a home computer using a remote access client computer, comprising:
   storing the virtual copy at the host computer;
   establishing commnunication between the remote access client computer and the host computer via a computer network;
   operating the remote access client computer to cause the host computer to execute applications of the virtual copy to return results, without simultaneously communicating with the home computer; and
   returning the results to the remote access client computer.

9. The method of claim 8, wherein the storing step includes copying at least some data of the home computer to the host computer via the Internet or other network.

10. The method of claim 9, wherein the host computer accesses an extensible shared library having common files therein, and the storing step includes recording the presence of common files in the home computer and not copying the common files from the home computer to the host computer.

11. The method of claim 8, wherein the host computer is remote from the home computer and the remote access client computer is remote from the host computer and the home computer.

12. The method of claim 8, further comprising periodically synchronizing the virtual copy of the home computer with the home computer.

13. The method of claim 8, wherein the home computer has a home operating system and the host computer has a host operating system, and the method further comprises:
   generating a user host registry configured for the host operating system from a registry received from the home computer, such that the user host registry reflects the user and application settings of the home computer.

14. The method of claim 13, wherein the host operating system includes a kernel, and the method further comprises:
   inserting one or more hooks into the kernel to cause the kernel to selectively access the user host registry in response to a registry call for operating the virtual copy.

15. The method of claim 8, wherein the host computer has a host operating system including a kernel mode and a user mode, and the method further comprises using asynchronous procedure calls (APCs) in transitions from the kernel mode to the user mode, whereby no synchronization objects need be implemented to support calls from the kernel mode into the user mode.

16. A general purpose computer programmed to undertake the method of claim 8.

17. A program product comprising:
   a computer program storage device readable by a host computer having a host operating system; and
   a program means on the program storage device and including program code elements embodying instructions executable by the host computer for performing method steps for permitting a user to control a virtual copy of a home computer using a remote access client computer, the method steps comprising:
   generating the virtual copy at the host computer;
   generating a user host registry configured for the host operating system from a home registry received from the home computer;
   receiving registry calls;
   accessing the user host registry in response to the calls to respond to the calls and generate results thereof; and
   returning the results to the remote access client computer.

18. The computer program product of claim 17, wherein the method steps further comprise inserting hooks into a kernel of the host operating system to cause the kernel to access the user host registry.

19. The computer program product of claim 18, wherein the host operating system has a kernel mode and a user mode, and the method steps further include using asynchronous procedure calls (APCs) in transitions from the kernel mode to the user mode, whereby no synchronization objects need be implemented to support calls from the kernel mode into the user mode.

20. The computer program product of claim 17, wherein the host computer accesses an extensible shared library having common file blocks therein, and the virtual copy is generated by copying at least some data of the home computer to the host computer via the Internet or other network and by recording the presence of common files in the home computer and not copying the common files from the home computer to the host computer.

21. The computer program product of claim 17, wherein the host computer is remote from the home computer and the remote access client computer is remote from the host computer and the home computer, and the method steps further comprise synchronizing the virtual copy of the home computer with the home computer.

22. A general purpose computer incorporating the computer program product of claim 17.

23. A program product comprising:
   a computer program storage device readable by a host computer having a host operating system; and
   a program means on the program storage device and including program code elements embodying instructions executable by the host computer for performing method steps for permitting a user to control a virtual copy of a home computer using a remote access client computer, the method steps comprising:
   generating the virtual copy at the host computer;
   receiving signals from the remote access client computer, at least some of the signals invoking calls;
   inserting hooks into a kernel of the host operating system to cause the kernel to respond to the calls using the host operating system to generate results; and
   returning the results to the remote access client computer.

24. The computer program product of claim 23, wherein the method steps further comprise:
   generating a user host registry configured for the host operating system from a home registry received from the home computer, such that the user host registry reflects the user and application settings of the home computer; and
   accessing the user host registry in accordance with the hooks as required by the calls.

25. The computer program product of claim 24, wherein the host operating system has a kernel mode and a user mode, and the method steps further include using asynchronous procedure calls (APCs) in transitions from the kernel mode to the user mode, whereby no synchronization objects need be implemented to support calls from the kernel mode into the user mode.

26. A general purpose computer incorporating the computer program product of claim 23.

\* \* \* \* \*